United States Patent
Lee et al.

(10) Patent No.: US 8,772,992 B2
(45) Date of Patent: Jul. 8, 2014

(54) AIRFOIL-MAGNETIC HYBRID BEARING AND A CONTROL SYSTEM THEREOF

(75) Inventors: Yong Bok Lee, Seoul (KR); Chang Ho Kim, Seoul (KR); Seung Jong Kim, Seoul (KR); Sang Hwa Lee, Anyang-si (KR); Hee Soo Kim, Gimhae-si (KR)

(73) Assignee: Korea Institute of Science and Technology, Seoul (KR)

( * ) Notice: Subject to any disclaimer, the term of this patent is extended or adjusted under 35 U.S.C. 154(b) by 439 days.

(21) Appl. No.: 12/739,590

(22) PCT Filed: Nov. 19, 2007

(86) PCT No.: PCT/KR2007/005811
§ 371 (c)(1),
(2), (4) Date: Jun. 7, 2010

(87) PCT Pub. No.: WO2009/054562
PCT Pub. Date: Apr. 30, 2009

(65) Prior Publication Data
US 2010/0247010 A1    Sep. 30, 2010

(30) Foreign Application Priority Data
Oct. 23, 2007  (KR) .......................... 10-2007-0106732

(51) Int. Cl.
*H02K 7/09*    (2006.01)
(52) U.S. Cl.
USPC .......................................................... 310/90.5
(58) Field of Classification Search
USPC .................. 310/90.5; 384/103, 104, 114, 253
IPC ....................................................... H02K 7/09
See application file for complete search history.

(56) References Cited

U.S. PATENT DOCUMENTS

| | | | | |
|---|---|---|---|---|
| 5,355,040 A | * | 10/1994 | New .............................. | 310/90.5 |
| 5,486,729 A | * | 1/1996 | Matsushita et al. .......... | 310/90.5 |
| 6,135,640 A | * | 10/2000 | Nadjafi ......................... | 384/103 |
| 6,288,465 B1 | * | 9/2001 | Suzuki et al. ................. | 310/90.5 |
| 2007/0164626 A1 | * | 7/2007 | Taniguchi et al. ........... | 310/90.5 |

FOREIGN PATENT DOCUMENTS

| | | |
|---|---|---|
| CN | 1730959 | 2/2006 |
| JP | 61-010116 A | 1/1986 |
| JP | 63-168501 A | 7/1988 |
| JP | 02-151239 A | 6/1990 |
| JP | 06-193633 A | 7/1994 |
| JP | 08-251865 A | 9/1996 |
| JP | 2003-074550 A | 3/2003 |
| JP | 2007-270647 A | 10/2007 |

* cited by examiner

*Primary Examiner* — Dang Le
(74) *Attorney, Agent, or Firm* — NSIP Law (57) ABSTRACT

An airfoil-magnetic hybrid bearing, which is a combination of a magnetic bearing and airfoil bearing includes a housing, an airfoil bearing, a magnetic bearing, coils, and a coupling segment. The housing is around a rotating shaft of a rotation device. The airfoil bearing is positioned between the housing and the rotating shaft to form dynamic pressure to levitate the rotating shaft during rotation of the rotating shaft. The magnetic bearing includes cores positioned radially between inner surface of the housing and outer surface of the airfoil bearing. The cores are projected to the center of the rotating shaft. The coils wound to the cores to levitate the rotating shaft using a magnetic attractive force generated by a current application thereto. The coupling segment is configured to couple the airfoil bearing to the magnetic bearing directly.

9 Claims, 11 Drawing Sheets

(a) prior art (b) the present invention

AIRFOIL-MAGNETIC HYBRID BEARING AND A CONTROL SYSTEM THEREOF

TECHNICAL FIELD

The present invention relates to a bearing which supports the rotating shaft of a high speed rotation device and a control system thereof, and more particularly to an airfoil-magnetic hybrid bearing being a combination of a magnetic bearing and airfoil bearing for supporting a rotating body of the rotation device, and a control system thereof. The high speed rotation devices using the hybrid bearing of the present invention can be an industrial compressor, a fan, an auxiliary power unit for aircraft, air conditioning system, etc.

BACKGROUND ART

There are many kinds of bearings for rotation devices. An airfoil bearing generates small friction force by making an air film between the rotating shaft and housing. Thus, the airfoil bearing is used for high speed rotation device but it has the dis-advantage of being difficult to control. However, a magnetic bearing can adjust the magnetic force of the electromagnet. Thus it has the advantage of being easy to control. However, it is also difficult to control at high speeds. In particular, if the rotating shaft is tilted to one side during high speeds and contacts the magnetic pole, then the system may be damaged. Thus, a hybrid bearing having an airfoil bearing and magnetic bearing used together has been developed for taking all the advantages of the airfoil bearing and the magnetic bearing.

Figure 1:
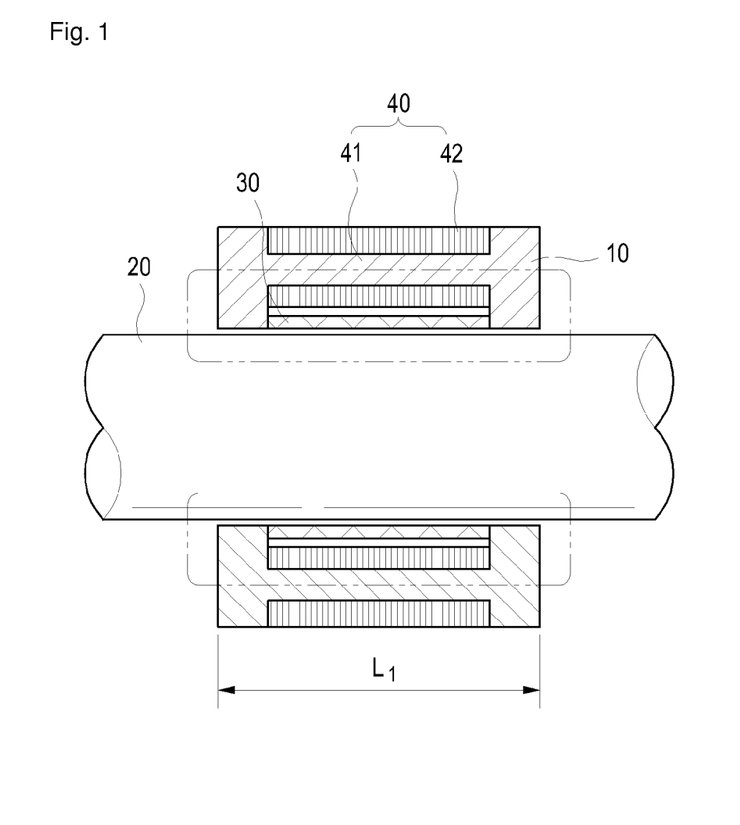
FIG. 1 is a side sectional view illustrating an example of a prior art airfoil-magnetic hybrid bearing.

Referring to FIG. 1, a prior art airfoil-magnetic hybrid bearing for a high speed rotation device will be described in detail.

FIG. 1 is a side sectional view illustrating an exemplary prior art airfoil-magnetic bearing. As illustrated, the prior art airfoil-magnetic hybrid bearing includes an airfoil bearing (30) around the rotating shaft (20) disposed at the center portion of a cylindrical housing (10) and a magnetic bearing (40) disposed around the airfoil bearing (30).

The housing (10) has cores (41) formed parallel to the rotating shaft (20) and coils (42) wound around the cores (41) respectively. The housing extends more deeply than the magnetic bearing (40) and the airfoil bearing (30) is mounted on the extended portion of the housing.

However, the core (41) of the prior art airfoil-magnetic hybrid bearing must be disposed parallel to the longitudinal direction of the housing (10), while the coil (42) must be wound around the core (41). Thus, the total length of the rotation rotor becomes longer. The airfoil bearing (30) is not coupled to the magnetic bearing (40) directly. An axial length (L1) of the housing (10) becomes longer since the housing (10) has the airfoil bearing (30) and the magnetic bearing (40) together.

Further, a radial thickness of the housing (10) around the rotating shaft (20) becomes larger since there is a gap between the airfoil bearing (30) and the magnetic bearing (40). Thus, total volume of the hybrid bearing becomes larger.

Further, the magnetic bearing (40) is positioned away from the rotating shaft due to the gap between the airfoil bearing (30) and the magnetic bearing (40). Thus, the magnetic bearing (40) has a low supporting efficiency.

DISCLOSURE OF INVENTION

Technical Problem

The present invention is conceived in order to solve the above problems. It is an objective of the present invention to provide an airfoil-magnetic hybrid bearing having a magnetic bearing being directly coupled to an airfoil bearing.

Further, it is another objective of the present invention to provide an airfoil-magnetic hybrid bearing for controlling the magnetic bearing to be used before levitation speed, during external force application, and in resonant frequency area.

Technical Solution

The present invention provides an airfoil-magnetic hybrid bearing comprising: a housing around a rotating shaft of a rotation device; an airfoil bearing positioned between the housing and the rotating shaft for forming dynamic pressure to levitate the rotating shaft during rotation of the rotating shaft; a magnetic bearing including a plurality of cores positioned radially between an inner surface of the housing and outer surface of the airfoil bearing, the cores being projected to the center of the rotating shaft, and coils wound to the cores to levitate the rotating shaft using a magnetic attractive force generated by a current application thereto; and a coupling segment for coupling the airfoil bearing to the magnetic bearing directly.

It is desired that the magnetic bearing operates in resonant speed area of a vibration mode without the magnetic bearing operation. Also, it should operate between the initial drive of the rotating shaft and levitation speed of the rotating shaft, the airfoil bearing levitating the rotating shaft at the levitation speed. Further, it should operate when the vibration displacement of the rotating shaft is bigger than the predetermined amplitude.

Preferably, the spaces between the cores and the coils are charged by dielectric bodies. A fixing slot is formed at one of the dielectric bodies. One end of the airfoil bearing is coupled to the coupling segment. Preferably, the coupling segment is inserted into the fixing slot in the axial direction for fastening.

Preferably, the fixing slot becomes narrower as it gets closer to the center of the rotating shaft. The coupling segment has a shape corresponding to the fixing slot.

The airfoil bearing includes a porous foil formed by a porous elastic body and a top foil laminated to the porous foil adjacent to the rotating shaft. One end of the airfoil bearing is fixed to the coupling segment and the other end is free.

Further, the present invention provides a control system for an airfoil-magnetic hybrid bearing comprising: an airfoil-magnetic hybrid bearing including a housing around the outer surface of a rotating shaft of a rotation device, an airfoil bearing positioned between the housing and the rotating shaft for generating dynamic pressure to levitate and support the rotating shaft during the rotation of the rotating shaft, and a magnetic bearing positioned between the airfoil bearing and the housing to levitate the rotating shaft using a magnetic attractive force; a position sensor sensing the vibration amplitude of the center of the rotating shaft; a speed sensor sensing the rotating speed of the rotating shaft; and a controller controlling the magnetic bearing. The controller operates the magnetic bearing when the rotating speed of the rotating shaft sensed by the speed sensor is under levitation speed, when the rotating speed of the rotating shaft is in the resonant area in the vibration mode without operation of the magnetic bearing, and when the displacement of the rotating shaft sensed by the position sensor exceeds the predetermined vibration amplitude. The airfoil bearing can levitate the rotating shaft at the levitation speed.

The controller operates the magnetic bearing between the start and levitation speed during the rotation device drive. After the end of the rotation device drive, the controller operates the magnetic bearing between the levitation speed and zero speed, the airfoil bearing levitating the rotating shaft at the levitation speed.

The resonant area in the vibration mode without operation of the magnetic bearing is from 90% to 110% of the resonant speed.

Advantageous Effects

According to the present invention, a hybrid structure of an airfoil bearing and the magnetic bearing can reduce the length of the rotor. Thus, it can drive close to the rigid mode area and the vibration can be reduced. Further, the total volume of the system can be reduced.

Moreover, according to the present invention, the airfoil bearing can be removed easily by using the coupling segment. Thus, the airfoil bearing can be replaced easily in instances where the airfoil bearing was broken, or depending on the circumstance, for changing the thickness or material of the airfoil bearing.

Moreover, according to the present invention, the magnetic bearing is driven in initial condition (under the levitation speed), in a condition of resonant area, and in a condition with external force application. Thus, the magnetic bearing can levitate the rotating shaft in the various states. Further, the rotating shaft can be supported efficiently and its constant position can be controlled. Further, the durability of the bearing can be improved.

BEST MODE FOR CARRYING OUT THE INVENTION

Hereinafter, referring to FIGS. 2 to 6, an embodiment of airfoil-magnetic hybrid bearing according to the present invention will be described in detail.

Figure 2:
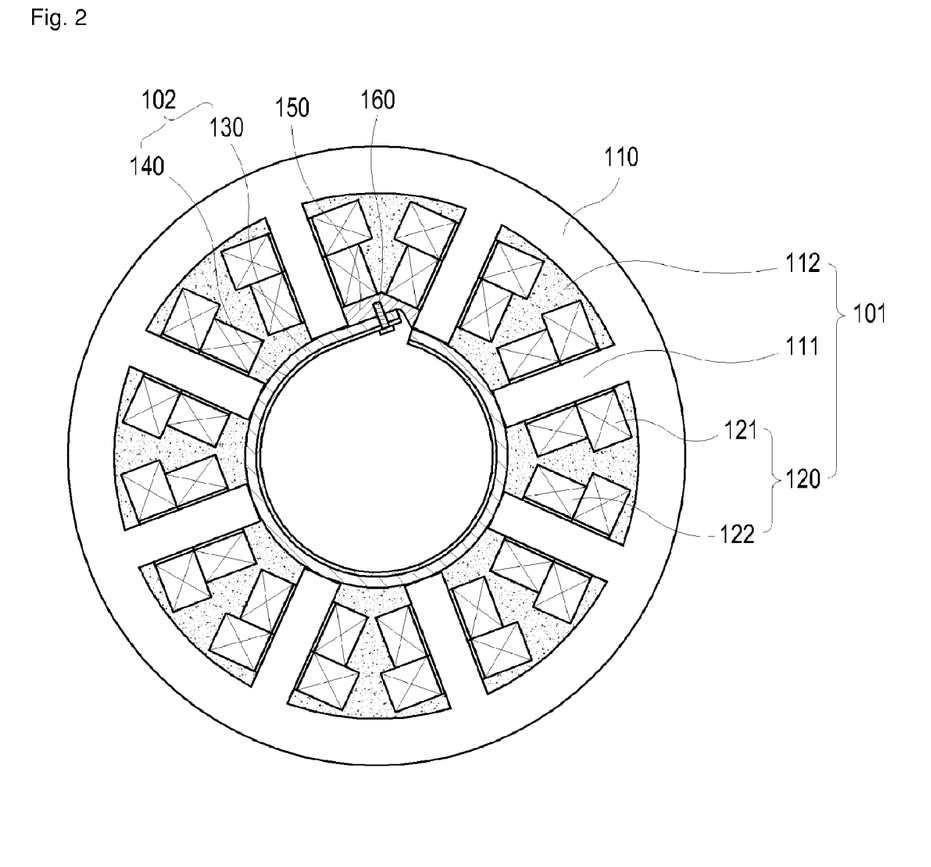
FIG. 2 is a front sectional view illustrating an embodiment of an airfoil-magnetic hybrid bearing according to the present invention.
Figure 3:
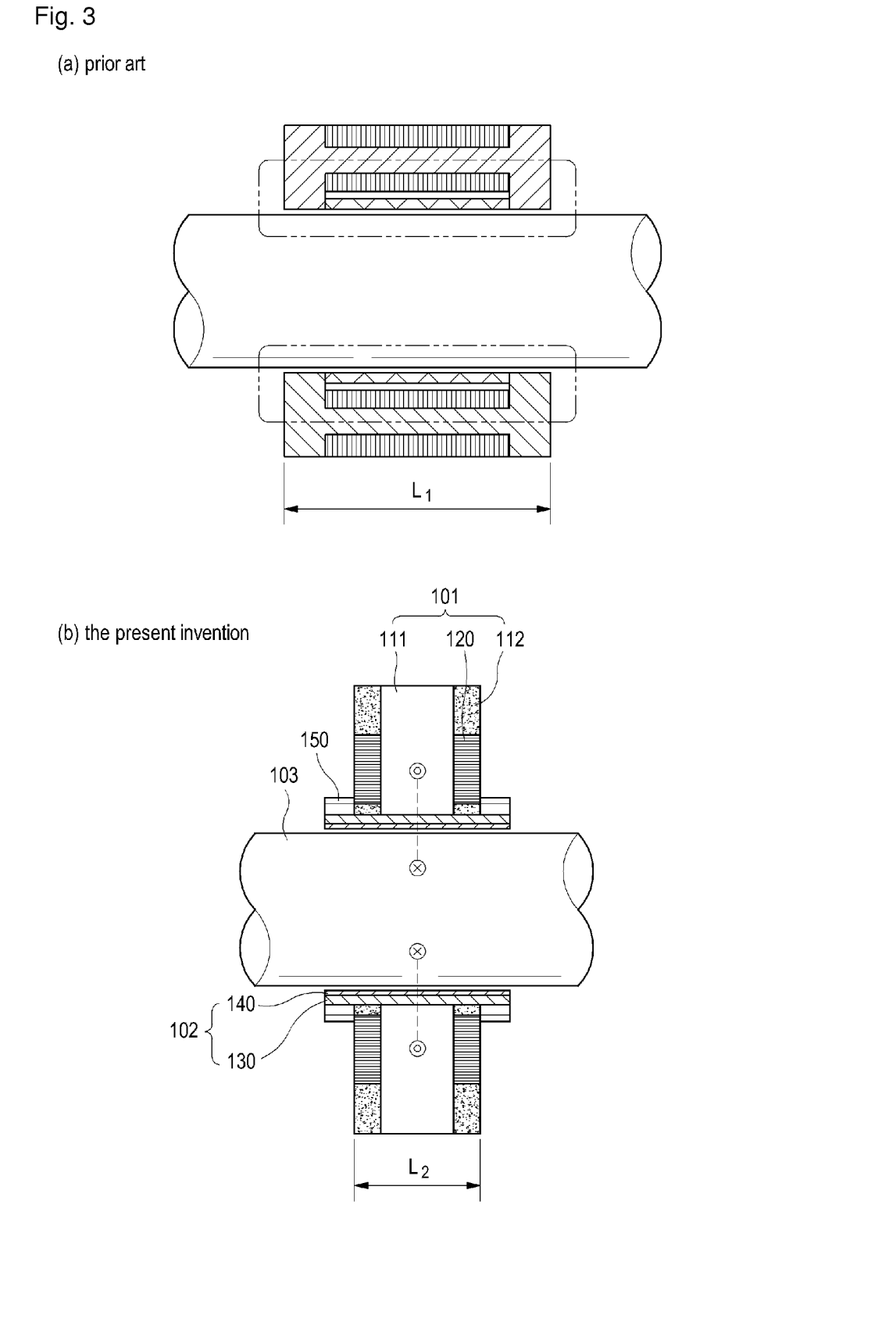
FIG. 3 is a side sectional view of FIG. 2 comparing it to the prior art.

FIG. 2 is a front sectional view illustrating an embodiment of an airfoil-magnetic hybrid bearing according to the present invention. FIG. 3 is a side sectional view of FIG. 2.

As shown in FIG. 2, the present invention comprises a magnetic bearing (101) having a plurality of cores (111) positioned radially from inside of a housing projecting to a center of the housing (110), and wherein the coils (120) are wound to the cores (111), and dielectric bodies (112) charged therebetween; an airfoil bearing (102) having porous foil (130) and top foil (140); and a coupling segment (150) coupling the magnetic bearing (101) to the airfoil bearing (102).

A gap between adjacent cores (111) becomes narrower at the portion closer to the center of the housing. Thus, winding density of the outside portion (121) of the coil (120) is different to that of the inside portion (122). Each coil is wound continuously without cutting. Coil turns of the outside portion is equal to those of the inside portion.

At one of the dielectric bodies (112) of the magnetic bearing (101), the dielectric substance is not charged in some areas of the center portion. A groove for receiving the coupling segment (150) is formed where the dielectric substance is not charged.

One end of the airfoil bearing (102) is fixed to the coupling segment (150). As illustrated, the porous foil (130) and the top foil (140) are fixed to the coupling segment (150) by a screw (160). The rotating shaft (103) or a portion facing the magnetic bearing of the rotating shaft is made of ferromagnetic material, to thereby be worked by a magnetic force of the magnetic bearing (101).

The porous foil (130) of the airfoil bearing (102) is a wired meshed foil made of porous elastic material. And the top foil (140) is positioned adjacent to the rotating shaft (not shown) for supporting the rotating shaft by an air film formed between the top foil and the rotating shaft during the rotation of the rotating shaft. The porous foil (140) has high damping performance. Thus, it is suitable as an airfoil bearing element of a super high speed rotation device.

As shown in FIG. 3 (b), if the direction of a magnetic field is changed, then the inner end of each core (111) will be as close as possible to the rotating shaft (103), maximizing efficiency of the magnetic bearing (101).

However, in FIG. 3 (b), the direction of the magnetic field is illustrated by marks ⊙ and □. Mark ⊙ means a direction coming from the drawing, and Mark □ means a direction going into the drawing. The direction of the magnetic field is perpendicular to the direction of the magnetic field shown in FIG. 3(a) of the prior art. Thus, in prior art (a), cores are disposed parallel to a rotating shaft. However, in the present invention (b), the cores (111) are disposed perpendicular to the rotating shaft. The housing (110) need not be formed around the magnetic bearing (101) and the airfoil bearing (102) wholly. Thus, the axial length (L2) of the magnetic bearing is much shorter than the length (L1) of the magnetic bearing (101) for reducing the space occupied axially by the bearing shown in prior art (a).

Figure 4:
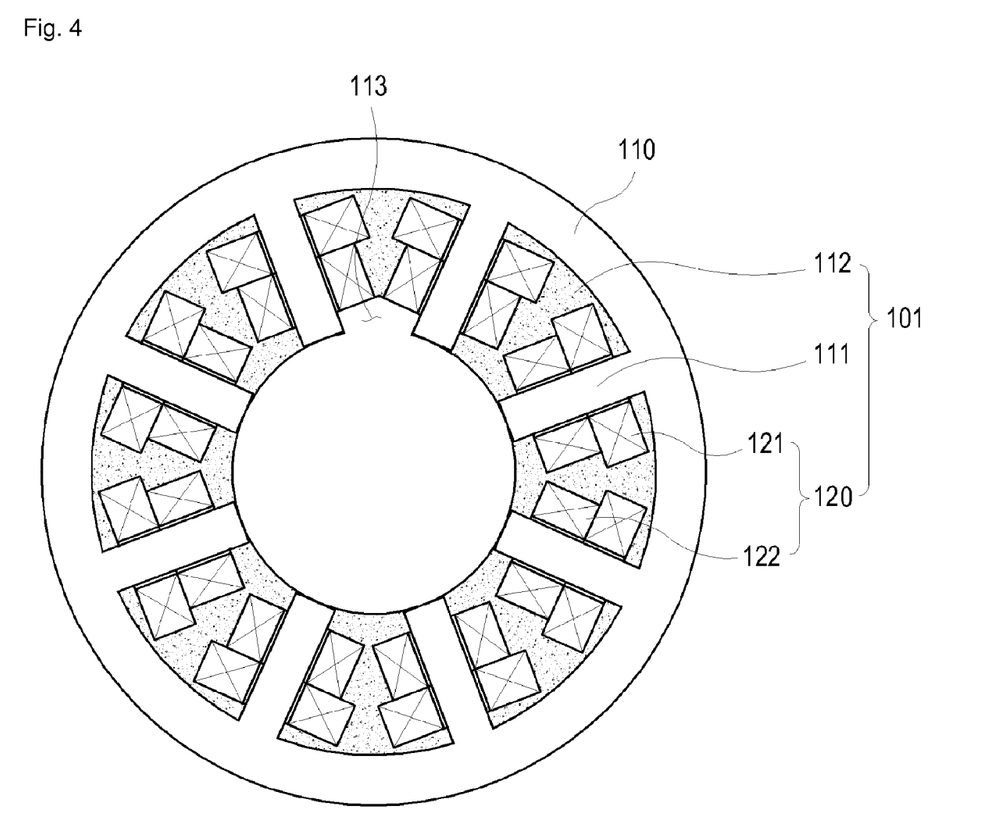
FIG. 4 is a front sectional view illustrating a magnetic bearing and a housing of the airfoil-magnetic hybrid bearing of FIG. 2.
Figure 5:
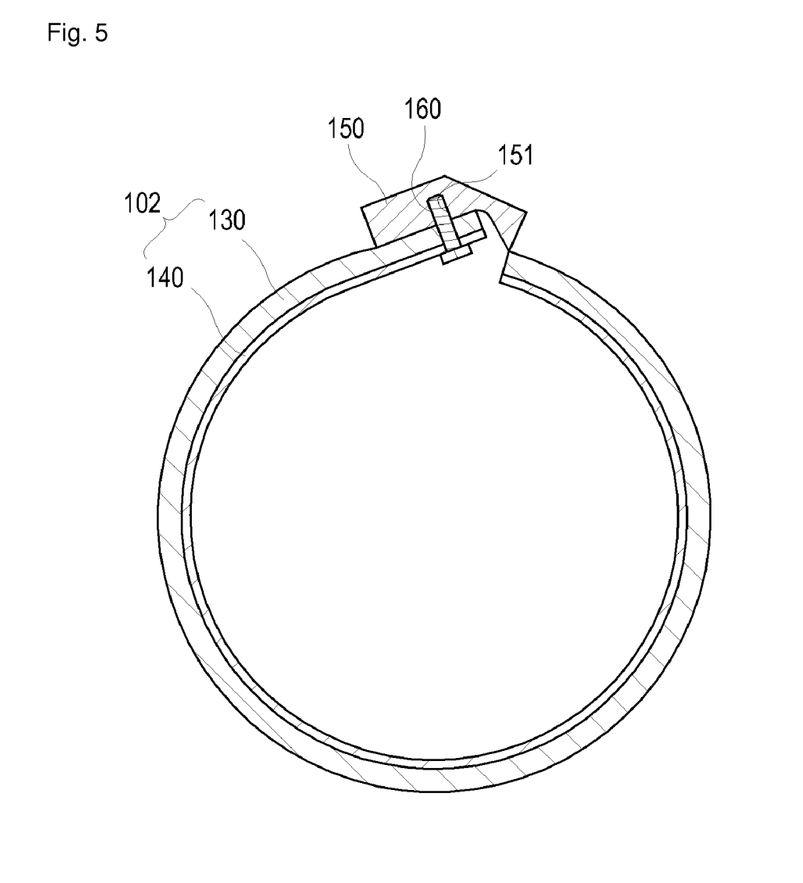
FIG. 5 is a front sectional view illustrating an airfoil bearing and a coupling segment of the airfoil-magnetic hybrid bearing of FIG. 2.

FIG. 4 is a front sectional view illustrating a magnetic bearing and a housing of the airfoil-magnetic hybrid bearing of FIG. 2. And FIG. 5 is a front sectional view illustrating an airfoil bearing and a coupling segment of the airfoil-magnetic hybrid bearing of FIG. 2. As shown in FIG. 4, the dielectric substance is not charged at the center portion of the dielectric bodies (112) of the magnetic bearing (101) for making a pentagonal fixing slot (113). As shown in FIG. 5, the shape of the coupling segment (150) corresponds to the fixing slot (113). One end of the porous foil (130) and the top foil (140) is fixed to the coupling segment (150) by a screw (160).

Hereinafter, functions and effects of the above airfoil-magnetic hybrid bearing will be described.

The fixing slot (113) becomes narrower at portions nearer to the center of the housing (110). The shape of the coupling segment (150) corresponds to that of the fixing slot (113). Thus, it becomes narrower at portions nearer to the center. Moreover, the coupling segment (150) cannot escape in the radial direction. And, the airfoil bearing (102) is coupled to the magnetic bearing (101) by the coupling segment (150) while it is not coupled to the housing. This reduces the total bearing volume.

Also, the airfoil bearing (102) blocks the core and the rotating shaft. Thus, during magnetic bearing (101) operation, the rotating shaft, which is a ferromagnetic body, cannot contact the magnetic bearing (101) directly.

Figure 6:
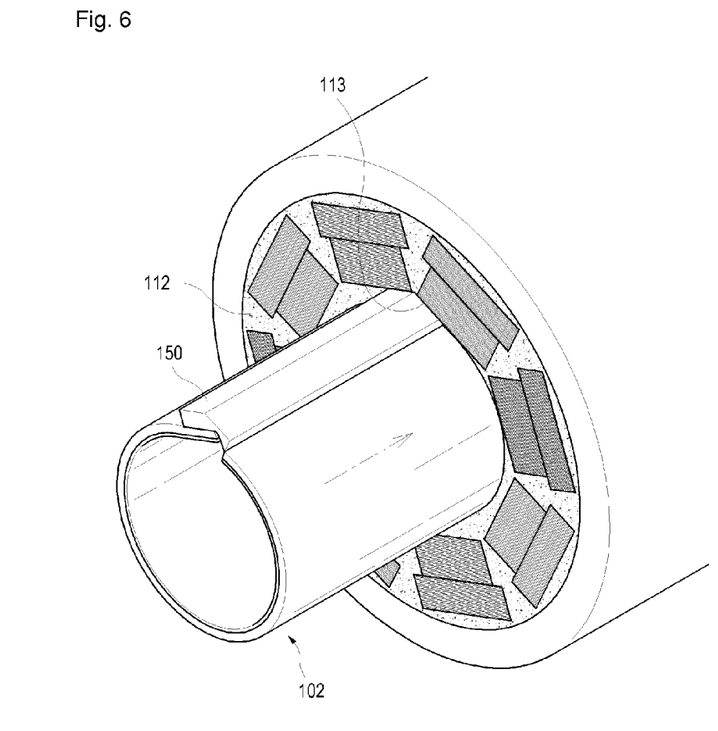
FIG. 6 is a perspective view illustrating a process for coupling the airfoil bearing to the magnetic bearing.

FIG. 6 is a perspective view illustrating a process for coupling the airfoil bearing to the magnetic bearing. As illustrated, one end of the airfoil bearing (102) is coupled to the coupling segment (150) while the coupling segment (150) is inserted into the fixing slot (113) axially for easy coupling between the magnetic bearing (101) and the airfoil bearing (102). Consequently, damaged airfoil bearing (102) can be replaced easily. Also, when the thickness or material of the airfoil bearing needs to be changed, the airfoil bearing (102) can be easily replaced.

Referring FIG. 7 to 9, an embodiment of a control system for airfoil-magnetic hybrid bearing according to the present invention will now be described.

Figure 7:
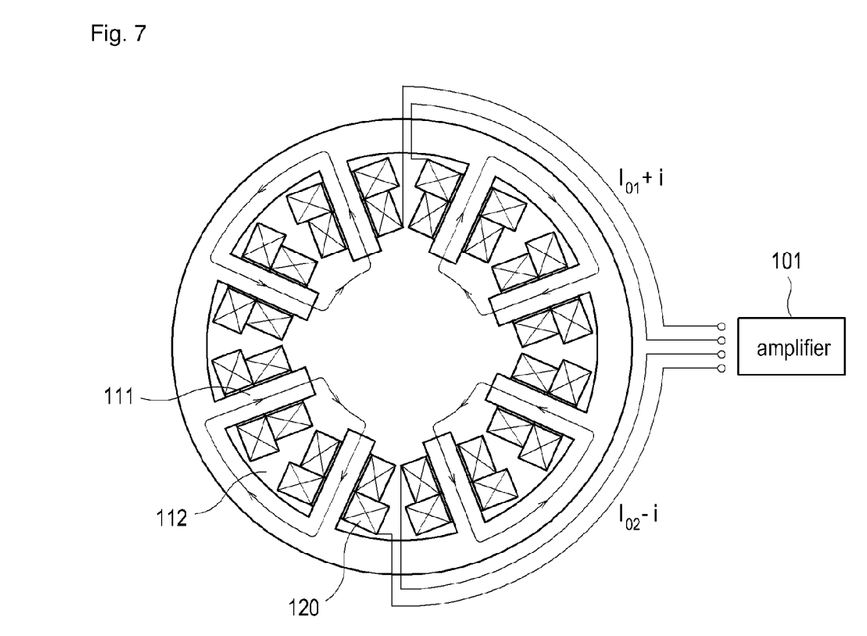
FIG. 7 is a schematic view illustrating a magnetic field generated by current application to the magnetic bearing of FIG. 5.

FIG. 7 is a schematic view illustrating a magnetic field generated by current application to the magnetic bearing of FIG. 5. As illustrated, eight cores (111) are vertically symmetric in this embodiment. Magnetic fields generated by coils (112) wound to two adjacent cores (111) are in the same direction. However, magnetic fields generated by coil (112) wound to the following two adjacent cores (111) are in the reversed direction.

With current application, four circular magnetic fields are formed around the rotating shaft. Upper attracting forces generated in the magnetic fields should be stronger considering the mass of the rotating shaft. Thus, current ($I_{01}+i$), adding control current (i) to bias current ($I_{01}$), is applied to each coil generating the upper portion of the magnetic field while currents ($I_{01}-i$), subtracting control current (i) from bias current ($I_{01}$), is applied to each coil generating the lower portion of the magnetic field.

Figure 8:
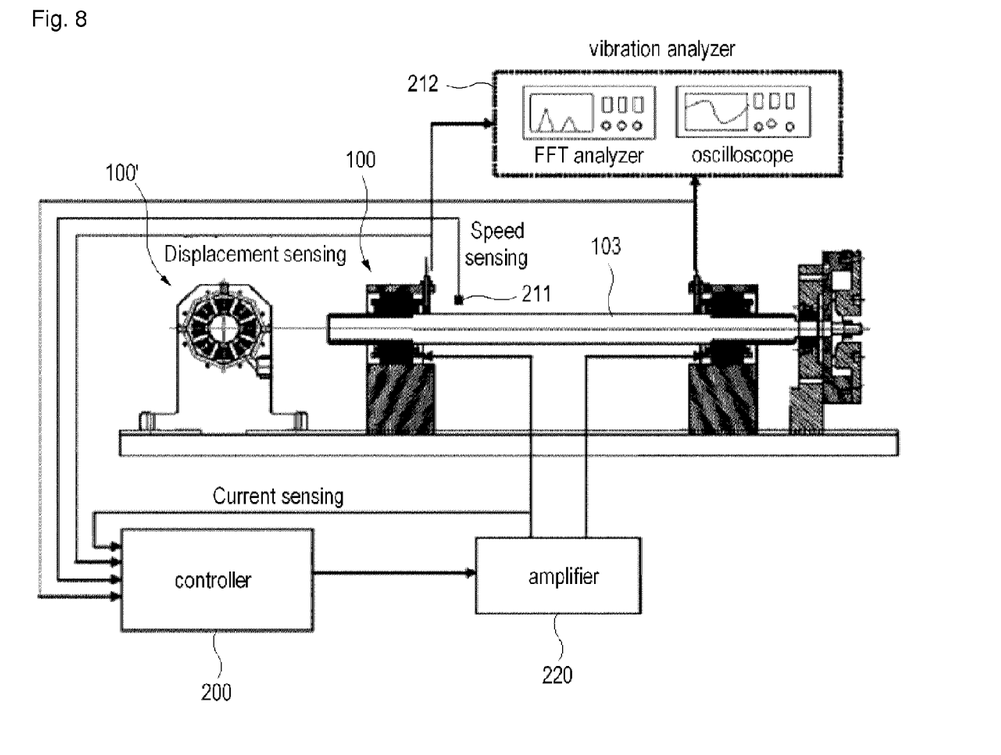
FIG. 8 is a block diagram illustrating a control system of an airfoil-magnetic hybrid bearing according to the present invention.

FIG. 8 is a block diagram illustrating a control system of an airfoil-magnetic hybrid bearing according to the present invention. As illustrated, the control system includes a sensor (211) for rotating the speed of the rotating shaft (103), a vibration analyzer (212) mounted on the bearing (100) for sensing the positional change from the center of the rotating shaft (103), a controller (200) controlling the current applied to the magnetic bearing considering the rotating speed and the position of the rotating shaft, and an amplifier (220) for amplifying the current to be applied to the magnetic bearing.

The controller (200) adjusts the magnitude of the current applied to the magnetic bearing (101) controlling the amplifier (220). Also, it continuously senses the current having been applied to the magnetic bearing from the amplifier (220).

The vibration analyzer (212) senses the amplitude of the rotating shaft (103) of the bearing (100') shown from the front. This can be a FFT analyzer or an oscilloscope.

Figure 9:
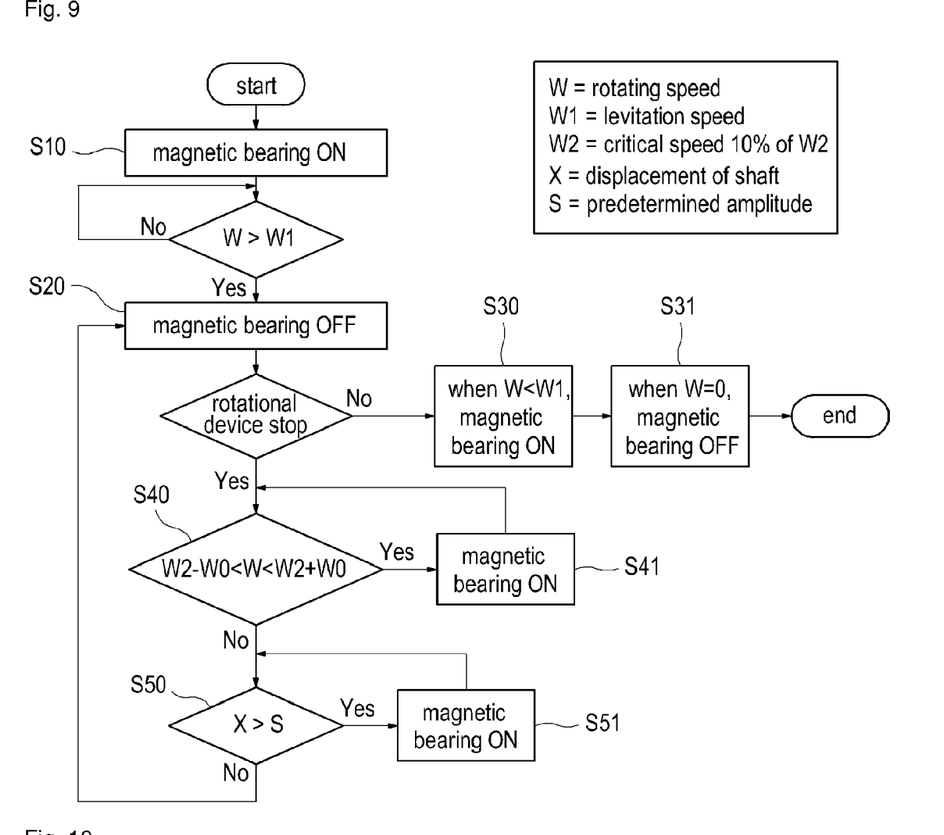
FIG. 9 is a flow chart illustrating a control process of the magnetic bearing of the control system of FIG. 8.

FIG. 9 is a flow chart illustrating a control process of the magnetic bearing of the control system of FIG. 8. As illustrated, the controller (200) operates the magnetic bearing (101) at initial driving state, at external force application, or at resonant area of a bearing vibration mode without current application to the magnetic bearing (101) (the first vibration mode).

At first, the magnetic bearing (101) is operated at initial driving state of a rotation device (S10) since the airfoil bearing (102) hardly generates dynamic pressure enough to support the rotating shaft at the initial driving state. At W1, the airfoil bearing (102) generates enough dynamic pressure to levitate the rotating shaft. If the rotating speed W sensed by the sensor (211) is lager than W1, then the magnetic bearing (101) will be stopped (S20).

On the other hand, if the rotation device is stopped, then the magnetic bearing (101) will be operated at the rotating speed of the rotating shaft (103) between the levitation speed W1 and the zero speed. Sine the hybrid bearing of this embodiment is used for super high speed rotation device, the rotating speed cannot be under the levitation speed during the rotation device driving. Thus, the magnetic bearing should be operated when the rotating speed W of the rotating shaft (103) is under the levitation speed W1 (the airfoil bearing (101) levitates the rotating shaft (103) at the levitation speed) after the rotation device stopped (S30). If the rotating shaft has been completely stopped and the rotating speed W is at zero, then the magnetic bearing (101) will be stopped (S31).

If a hybrid bearing of the present invention uses a low speed rotation device, then the magnetic bearing will be operated while the rotating speed W is below the levitation speed W1 until the rotating speed W becomes zero. Whether the rotating speed W is below the levitation speed W1 is sensed in real time without relation to whether the rotation device has been stopped.

The critical speed W2 is a resonant speed at the vibration mode with only airfoil bearing of the airfoil-magnetic hybrid bearing operation. W0 is a 10% value of W2. In this embodiment, the magnetic bearing (101) operates while the rotating speed of the rotating shaft (103) is between 90% critical speed and 110% critical speed. The controller estimates whether the rotating speed W is between W2−W0 (90% critical speed) and W2+W0 (110% critical speed) (S40). If the estimated value is within the range, then the controller will operate the magnetic bearing (103) (S41).

If an external force is applied in the state over the levitation speed out of the resonant area, the rotating shaft (103) can vibrate. In this case, it can make a friction to the airfoil bearing, even can make a fracture of the bearing or the rotating shaft. Thus, if the position of the center of the rotating shaft (103) gets out of the predetermined amplitude, it will be preferred to operate the magnetic bearing (101). S represents predetermined amplitude for estimating external force application. The controller (200) determines whether the displacement of the rotating shaft X sensed by a position sensor and analyzed in the vibration analyzer (212) exceeds the S (S50). If the displacement of the rotating shaft (103) X is over S, then the controller will operate the magnetic bearing (101) (S51).

Referring to FIGS. 10 to 13, function and effects of the control system for the airfoil-magnetic hybrid bearing according to the present invention will now be described.

Figure 10:
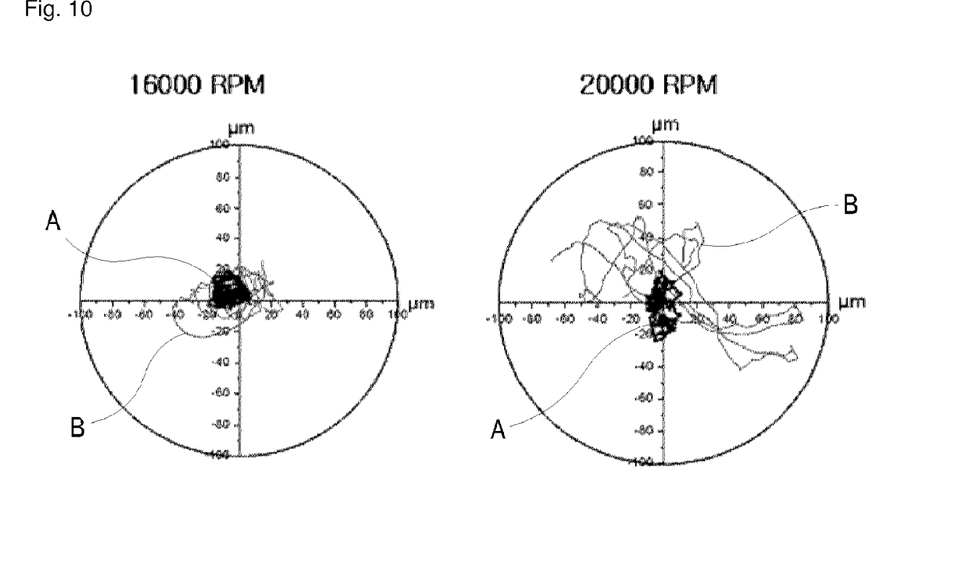
FIG. 10 illustrates orbit graphs of the rotating shafts, one rotating shaft being supported by the airfoil-magnetic hybrid bearing while the other being supported by only an airfoil bearing.

FIG. 10 illustrates orbit graphs of the rotating shafts, one rotating shaft being supported by the airfoil-magnetic hybrid bearing while the other being supported by only an airfoil bearing. In FIG. 10, a bold line A indicates a displacement of the rotating shaft while the rotating shaft (103) is supported by the airfoil-magnetic hybrid bearing. On the other hand, a fine line B indicates a displacement of rotating shaft while the rotating shaft is supported only by the airfoil bearing.

As illustrated, the supporting force of B is smaller since it has inferior damping performance at the same RPM. Thus, the displacement of the rotating shaft is larger. Particularly, at 20000 RPM (resonant speed), the displacement becomes very large. However the displacement of A is very small. That is, the rotating shaft may not be far away from the center in A. Thus, it is understood that the damping performance becomes considerably improved.

Figure 11:
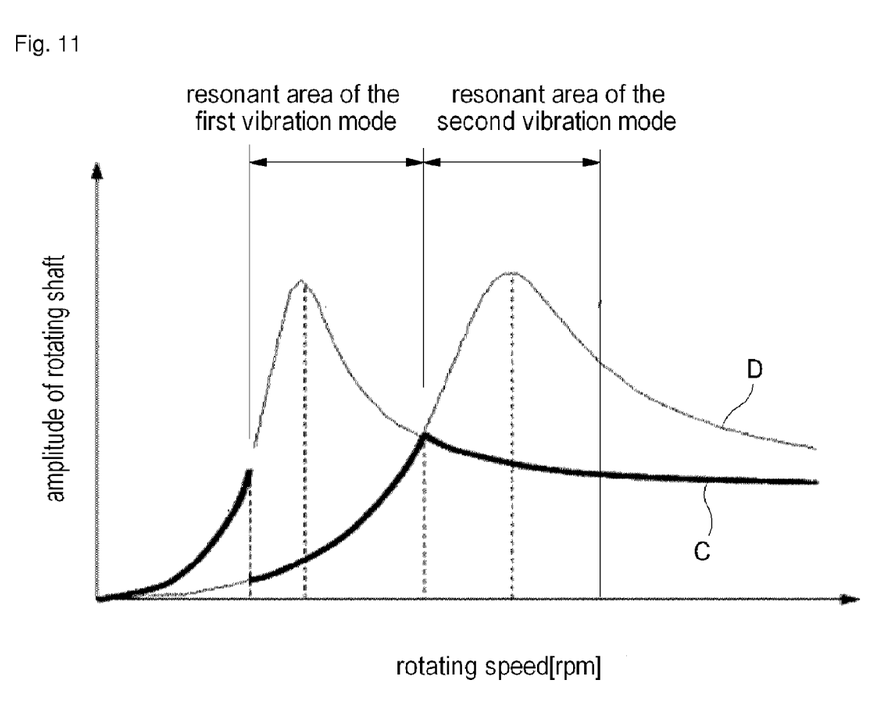
FIG. 11 is a graph illustrating controlled amplitude in resonant area using the airfoil-magnetic hybrid bearing according to the present invention.

FIG. 11 is a graph illustrating controlled amplitude in the resonant area using the airfoil-magnetic hybrid bearing according to the present invention. The hybrid bearing of the present invention has two vibration modes. Only airfoil bearing (102) is driven in the first vibration mode C, without operation of the magnetic bearing (101), while both of the airfoil bearing (102) and the magnetic bearing (101) are driven in the second vibration mode D.

As illustrated, the amplitude of the rotating shaft (103) follows the line C due to the increment of rotating speed after the rotation start. The amplitude increases significantly near the resonant area of the first vibration mode. At this time, the amplitude can be decreased by the operation of the magnetic bearing (101). With the magnetic bearing (101) operation, the hybrid bearing follows the line D while the amplitude increases again due to the increment of the rotating speed. The amplitude in the vibration mode of line C decreases after resonance. Thus, the operation of the magnetic bearing should be stopped line C and line D cross. After line C and D cross, the vibration mode follows line C. Thus, the amplitude of the rotating shaft (103) follows the bold line maintained within predetermined amplitude. In this embodiment, the magnetic bearing (101) operates in the range between 90% resonant speed and 110% resonant speed of vibration mode of line C.

Figure 12:
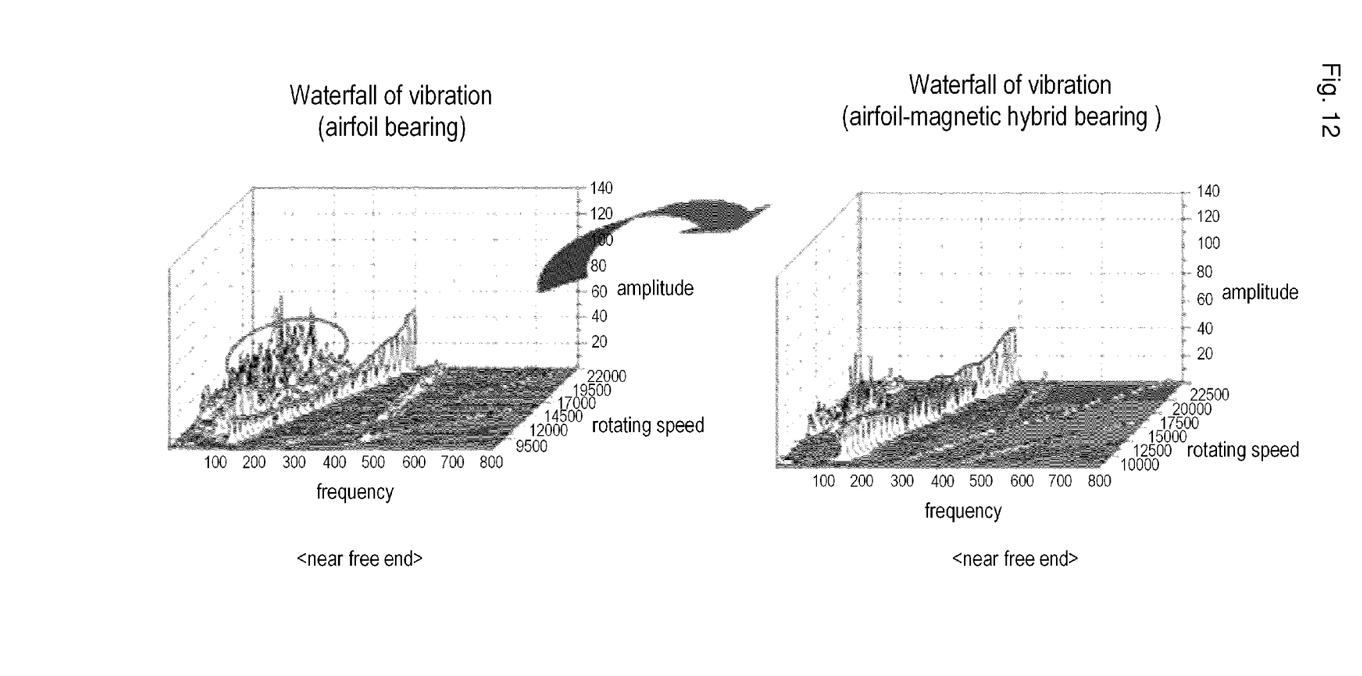
FIG. 12 illustrates waterfall graphs near the free ends of the rotating shafts of a prior art airfoil bearing and an airfoil-magnetic hybrid bearing according to the present invention.
Figure 13:
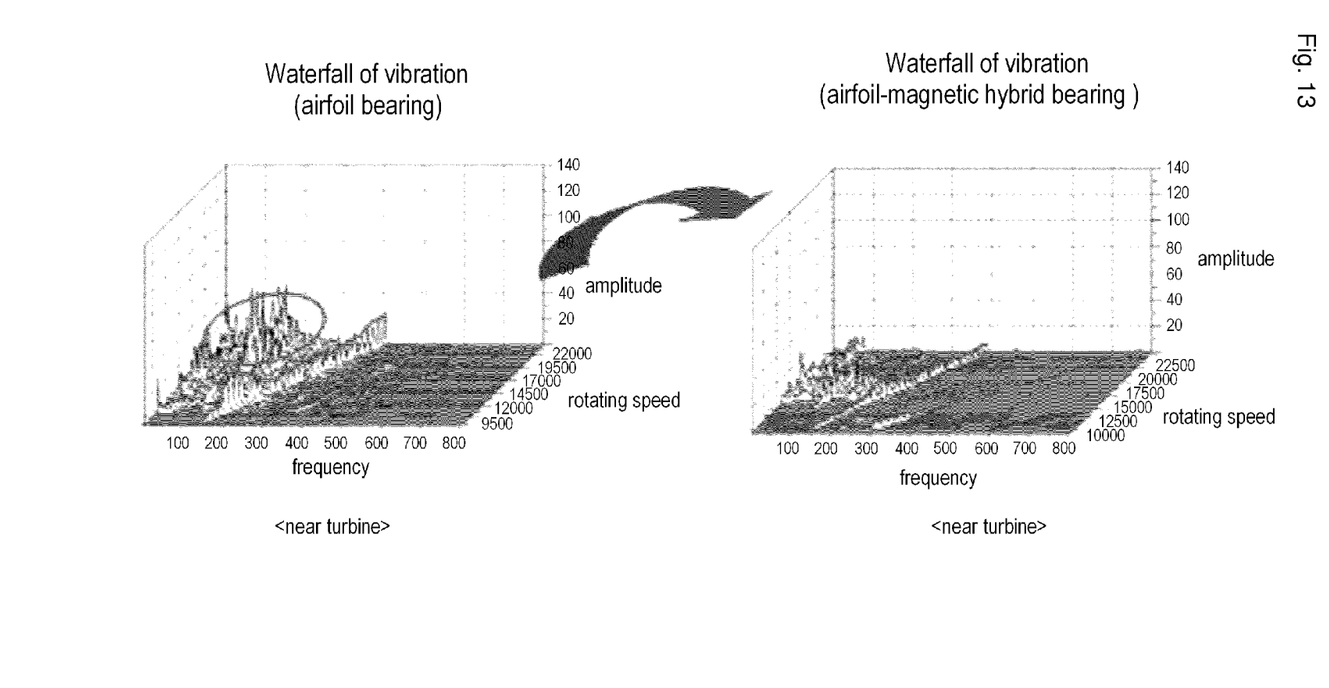
FIG. 13 shows waterfall graphs near the turbine of the rotating shaft of the prior art airfoil bearing of FIG. 12 and the airfoil-magnetic hybrid bearing according to the present invention.

FIGS. 12 and 13 are graphs for comparing a waterfall of vibration of the airfoil-magnetic hybrid bearing according to the present invention to a waterfall of vibration of a prior art airfoil bearing. As illustrated, if only the airfoil bearing is operated, then the asynchronous vibration component indicated in the circle at the free end or the turbine end of the rotating shaft will be outstanding. However, it is understood that the vibration control performance can be improved since the above airfoil-magnetic hybrid bearing is used for additional damping of the asynchronous vibration component.

The bearing described in the above embodiments and accompanying drawings is a journal bearing. However, the hybrid bearing can be adapted to a thrust bearing supporting the rotating shaft axially. That is, a ferromagnetic thrust disk is formed at the rotating shaft radially while a hybrid bearing having an airfoil bearing and a magnetic bearing is mounted on a front and rear portion to the disk for supporting the rotating shaft axially.

While the present invention has been described and illustrated with respect to a preferred embodiment of the invention, it will be apparent to those skilled in the art that variations and modifications are possible without deviating from the broad principles and teachings of the present invention, which should not be limited solely by the scope of the claims appended hereto.

The invention claimed is:

1. An airfoil-magnetic hybrid bearing comprising:
a housing around a rotating shaft of a rotation device;
an airfoil bearing positioned between the housing and the rotating shaft and configured to form dynamic pressure to levitate the rotating shaft during rotation of the rotating shaft;
a magnetic bearing comprising cores positioned radially between an inner surface of the housing and an outer surface of the airfoil bearing, the cores being projected to the center of the rotating shaft, and coils wound around the cores, the coils configured to levitate the rotating shaft using a magnetic attractive force generated by a current application thereto; and
a coupling segment configured to couple the airfoil bearing to the magnetic bearing directly,
wherein the spaces between the cores and the coils are charged by dielectric bodies, wherein a fixing slot is formed at one of the dielectric bodies, wherein one end of the airfoil bearing is coupled to the coupling segment, wherein the fixing slot becomes narrower while it becomes closer to the center of the rotating shaft, and wherein the coupling segment has a shape corresponding to the fixing slot, the coupling segment being inserted into the fixing slot in a longitudinal direction to the rotating shaft for fastening.

2. The hybrid bearing of claim 1, wherein the magnetic bearing operates in resonant speed area of a vibration mode without the magnetic bearing operation.

3. The hybrid bearing of claim 1, wherein the magnetic bearing operates between an initial drive of the rotating shaft and a levitation speed of the rotating shaft while the rotating shaft is levitated by the airfoil bearing at the levitation speed.

4. The hybrid bearing of claim 1, wherein the magnetic bearing operates when the vibration displacement of the rotating shaft is bigger than the predetermined amplitude.

5. The hybrid bearing of any one of claims 1 to 4, wherein the airfoil bearing includes a porous foil formed by a porous elastic body and a top foil laminated to the porous foil adjacent to the rotating shaft, and wherein one end of the airfoil bearing is fixed to the coupling segment and another end of the airfoil bearing is left free.

6. The hybrid bearing of claim 1, wherein each one of the cores is positioned radially between an inner surface of the housing and an outer surface of the airfoil bearing, each of the cores is projected to the center of the rotating shaft, and coils are wound around each of the cores.

7. The hybrid bearing of claim 1, wherein the coils have a different winding density between an outside portion of the coil and an inside portion of the coil located closer to the rotating shaft than the outside portion of the coil.

8. The hybrid bearing of claim 7, wherein a number of coil turns on an outside portion of the coil are equal to a number of coil turns on an inside portion of the coil.

9. The hybrid bearing of claim 1, wherein the airfoil bearing is configured to be coupled to the magnetic bearing by the coupling segment while the airfoil bearing is disassociated from the housing to reduce a total bearing volume.

* * * * *